G. A. GASMAN & F. G. MURRAY.
DISTRIBUTING CHUTE FOR MAIL BAGS.
APPLICATION FILED JUNE 3, 1912.
1,051,368.
Patented Jan. 21, 1913.
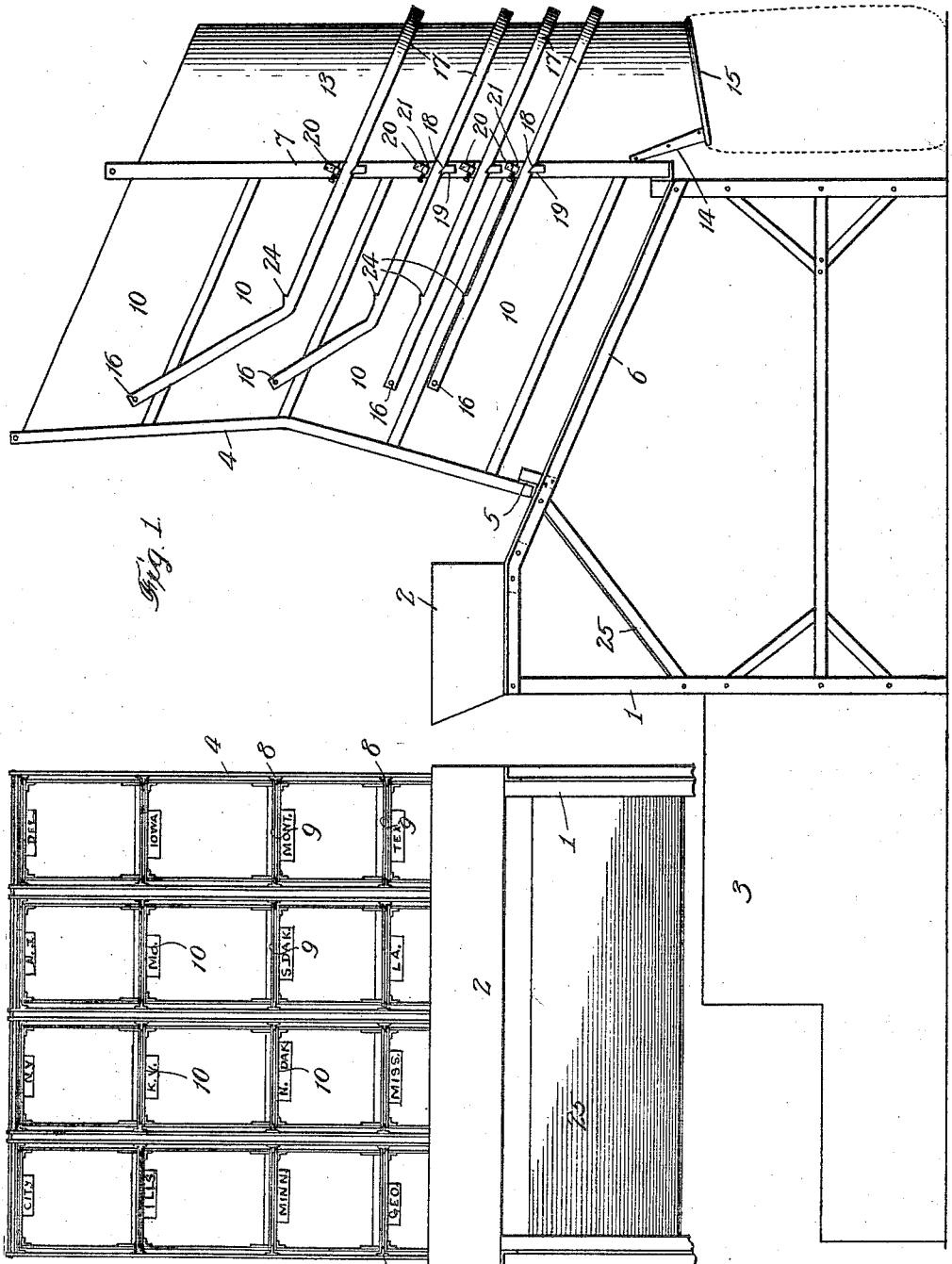

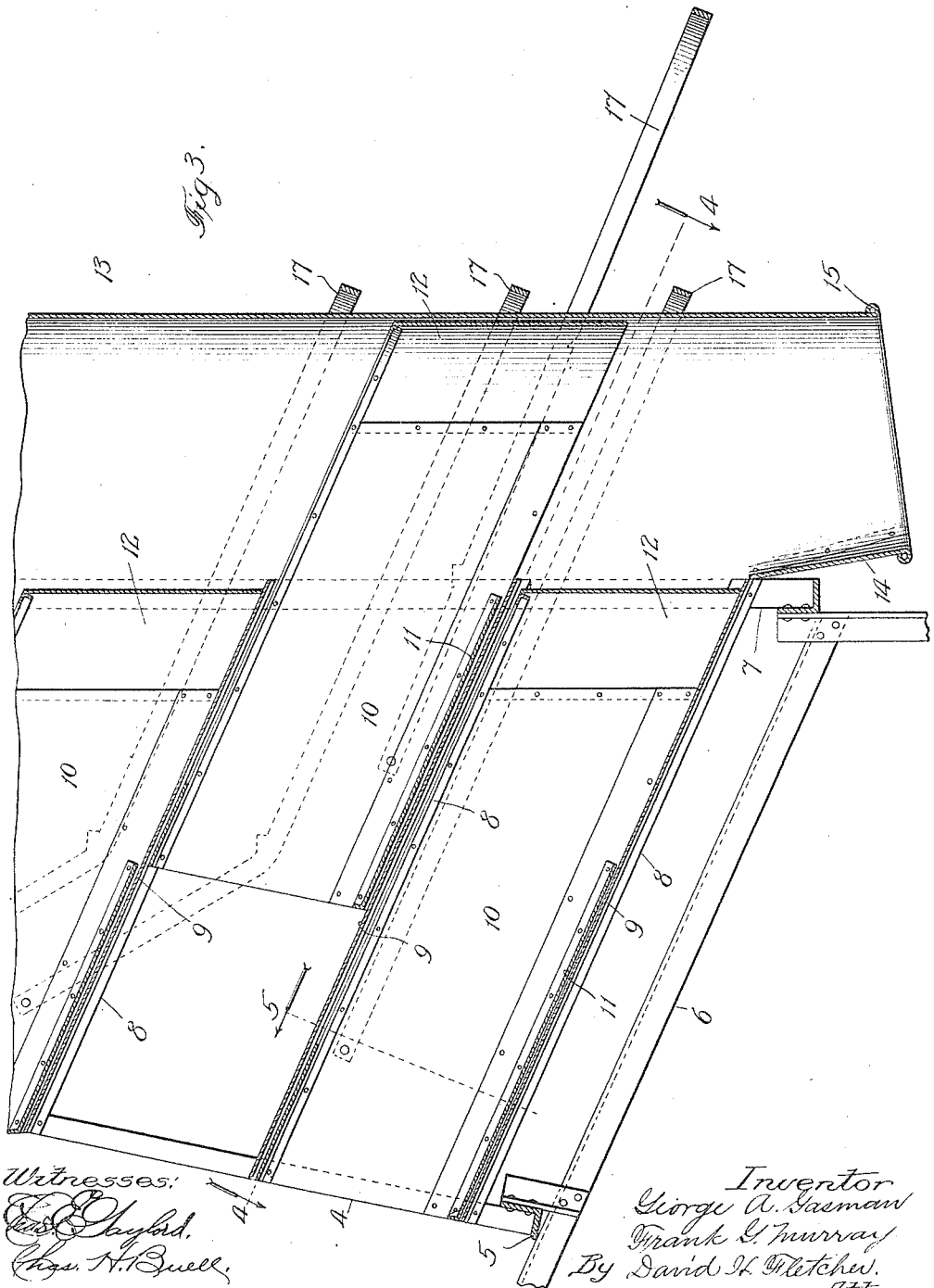

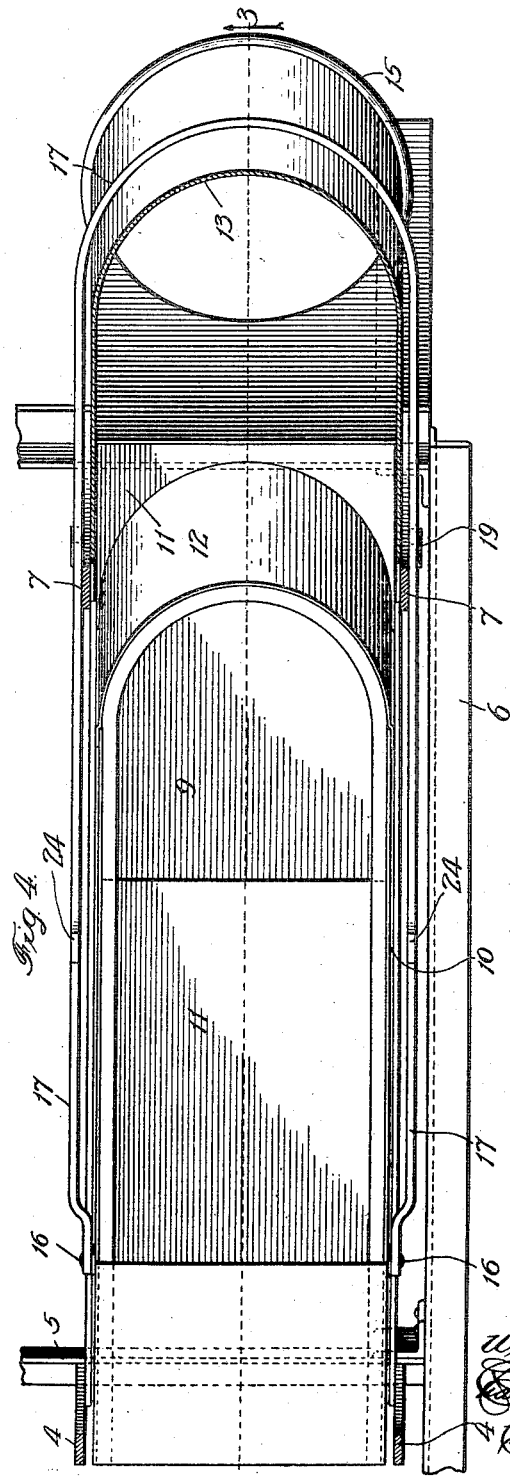
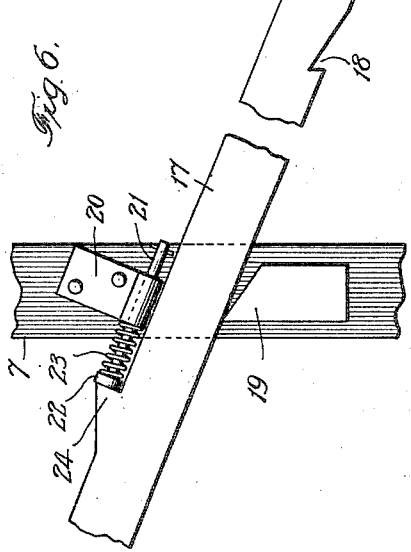
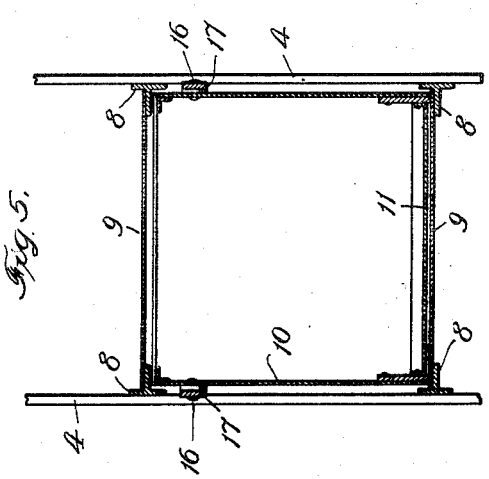

UNITED STATES PATENT OFFICE.

GEORGE A. GASMAN AND FRANK G. MURRAY, OF CHICAGO, ILLINOIS, ASSIGNORS TO THE B. F. CUMMINS COMPANY, A CORPORATION OF ILLINOIS.

DISTRIBUTING-CHUTE FOR MAIL-BAGS.

1,051,368.   Specification of Letters Patent.   Patented Jan. 21, 1913.

Application filed June 3, 1912. Serial No. 701,438.

*To all whom it may concern:*

Be it known that we, GEORGE A. GASMAN and FRANK G. MURRAY, citizens of the United States, residing at Chicago, in the county of Cook and State of Illinois, have invented certain new and useful Improvements in Distributing-Chutes for Mail-Bags, of which the following is a description, reference being had to the accompanying drawings, forming a part of this specification, in which corresponding numerals of reference in the different figures indicate like parts.

The object of our invention is to provide a simple and effective classifying device to enable articles to be separated, classified and delivered into separate parcels or packages for whatever purpose may be found desirable.
In the example illustrated our invention has especial reference to the separation, classification and delivery into bags of mail-matter, such, for example, as newspapers, packages and parcels exclusive of "first-class" matter.

To this end, our invention consists in providing a plurality of longitudinally movable receptacles open at their upper ends, said receptacles being supported in a common frame in operative proximity to a downwardly directed chute, each of said receptacles having a normally closed delivery opening adapted to communicate with said chute when said receptacles are in an abnormal position, means for holding said receptacles in a normal position and for independently moving them into an abnormal or discharging position, all of which is hereinafter more particularly described and definitely pointed out in the claims.

In the drawings, Figure 1, is a side elevation of a device embodying the features of the invention, Fig. 2, is a front elevation thereof showing a number of tiers of receptacles, Fig. 3, is an enlarged longitudinal sectional view taken upon the line 3, Fig. 4, viewed in the direction of the arrow there shown, Fig. 4, is a sectional view in plan, taken upon the line 4—4, Fig. 3, Fig. 5, is a sectional view, taken upon the line 5, Fig. 3, viewed in the direction of the arrow there shown, and Fig. 6, is an enlarged side view in detail showing a portion of one of the shifting bails with buffing and locking mechanism.

Referring to the drawings, 1 represents generally the main portion of a framework upon the forward part of which is a raised platform 3, for the use of the operators who stand in front of the hopper. A super-structure is mounted above the main frame having forward upright members 4, attached to horizontal cross-bars 5, Figs. 1, 3, and 4, which are in turn attached through intervening members as shown to rearwardly inclined side-bars 6. Vertical frame members 7, which are rigidly attached to the rear of the main frame, form a part of said superstructure. The members 4 and 7 are connected by means of inclined angle-bars or frame-members 8, which are substantially parallel with the frame-members 6. Sheet-metal plates 9 forming floors or false-bottoms, for the purpose hereinafter stated, are riveted to the flanges of the members 8, extending from end to end thereof as more clearly shown in Figs. 3 and 5. Elongated movable receptacles 10, which are rectangular in cross-section, are loosely fitted in the framework one above the other, so that by preference they may form a plurality or series of tiers of receptacles as shown in Figs. 1 and 2, with their open ends presented toward the hopper 2. The length of said receptacles corresponds to that of the floors or false bottoms 9, upon which they are adapted to slide longitudinally, and each is provided with a bottom 11, which is extended downwardly throughout a portion only of its length so as to provide for a discharge opening at the bottom when said receptacle is moved into an abnormal or discharging position; said opening being extended rearwardly a predetermined distance corresponding substantially to the longitudinal movement of said receptacle when moved for the purpose of discharging it. When the receptacle is in normal position, said opening is intended to be closed by the floor 9, which forms a temporary bottom therefor. The lower end of each receptacle is rounded or semi-cylindrical as shown at 12, and the end portion is vertical as represented in Fig. 3.

Rigidly attached to and extending rearwardly from the uprights 7, is a substantially vertical casing or wall forming a chute generally designated by 13, which is open at the bottom, and is provided with a rounded or circular and slightly tapered discharge portion 14, at the lower end, having a bead 15, thereon to serve as a means for attaching an ordinary mail-bag thereto as indicated in dotted lines in Fig. 1. Said chute is also open laterally toward said receptacle from the top of the upper to the bottom of the lowermost receptacle, as shown in Figs. 3 and 4 to permit said receptacles to slide into it.

Jointedly attached at 16, to the side of each receptacle is a bail 17, which is of sufficient length to extend to the rear of the chute 13, around which it is bent in the manner shown. All the bails of a given tier of receptacles are rearwardly inclined and disposed outside of and adjacent to the uprights 7. Each bail is provided with two notches 18, formed in the under side of each of the parallel members thereof and so placed that when the receptacle is in its normal position as shown in Fig. 1, said notches will engage with detents 19, upon the sides of said uprights and hold said receptacle in place. Each of said receptacles is adapted to slide downwardly when released, so that the lower end will enter and fit within the rounded chute; but in order to avoid unnecessary impact and noise as well as to produce a slight rebounding action to overcome the inertia of the mail-matter therein, we prefer to provide spring-buffers therefor. Riveted to the uprights 7, are lugs 20, better shown in Fig. 6, having bores therein into which are loosely fitted buffer-pins 21, having heads 22, at the upper ends, between which and said lugs are interposed coiled springs 23. Shoulders 24, are formed upon the bails 17, in position to engage with the heads of said buffer-pins when the receptacle reaches its extreme abnormal position, so as to cushion its downward movement.

There may be as many receptacles 10, in a given tier for a given chute as may be deemed necessary to conform to varying conditions. In ordinary practice we would employ a plurality of tiers, preferably about seven, with about four receptacles in each tier; each receptacle having the capacity of an ordinary mail-bag. Each receptacle is marked upon the front as shown in Fig. 2, with the name of the State, city, place or route for which the mail to be placed therein is destined. The mail-pieces, such as newspapers or packages of a predetermined class, are dumped into the hopper 2 and the attendant or attendants, standing upon the platform 3, throw the pieces as they are picked up into the several receptacles before them according to their respective destinations. Mail-bags are tied upon the several chutes as indicated in dotted lines in Fig. 1, and whenever a given receptacle is filled an attendant grasps the bail 17, which holds that receptacle and lifts it until the notches 18, are released from the catch. The receptacle then slides down as shown in Fig. 3, when the contents are discharged through the chute into the mail-bag. The striking of the shoulders 24, against the buffer-springs, aids in causing any mail-pieces which may tend to stick in the receptacle, to be discharged. Immediately upon emptying the receptacle, the attendant grasps the bail 17, and pushes the receptacle back to its normal position where it is held by the detents 19, which engage the notches 18.

From the foregoing it will be seen that the flooring or false bottom 9 in the casing acts as a temporary bottom to close the discharge opening in the receptacle while the latter is in position to be filled and that each receptacle may be discharged independently of its fellows. The advantage of this feature is that the work of distribution need not be interrupted to permit the discharge of any given receptacle.

Extending forwardly and downwardly from the bottom of the receptacle to the top of the platform 3, is an inclosed apron 25, upon which misdirected mail-pieces may fall so that they may be caused to slide down upon the platform to be recovered by the attendants.

Having thus described our invention, we claim:

1. A device of the class described, comprising in combination a downward discharge chute, a plurality of movable receptacles common to said chute, but normally out of communication therewith and means for independently moving said receptacles into discharging communication therewith.

2. A device of the class described in which is combined a downwardly directed discharge chute, a plurality of downwardly inclined longitudinally movable receptacles common to said chute, but normally out of communication therewith and means for independently moving said receptacles into discharging communication therewith.

3. A device of the class described, in which is combined a downwardly directed discharge chute, a plurality of downwardly inclined longitudinally movable receptacles common to said chute, each of said receptacles being open at its upper end and having a discharge opening adapted when said receptacle is in an abnormal position to communicate with said chute, means for normally holding each of said receptacles in a non-discharging position and means for moving the same into a discharging position.

4. A device of the class described, in which is combined a downwardly directed discharge chute, a plurality of downwardly inclined longitudinally movable receptacles supported in guides one above the other in operative proximity to said chute, each of said receptacles being open at its upper end and having a discharge opening adapted when said receptacle is in an abnormal position to communicate with said chute, means for holding each of said receptacles in a normal position, means for closing said discharge opening when said receptacle is in normal position and means for moving said receptacle into a discharging position.

5. A device of the class described, in which is combined a plurality of longitudinally movable receptacles located one above the other, each of said receptacles being open at one end for the deposit therein of articles, said receptacles having normally closed discharge openings arranged when in an abnormal position to communicate with a discharge chute, a discharge chute common to all of said receptacles, means for moving said receptacles into and out of communication with said chute and means for separately locking each of said receptacles in a normal position.

6. A device of the class described in which is combined a plurality of inclined longitudinally movable receptacles open at their upper ends, said receptacles being supported in a stationary frame and each having an opening in the bottom thereof extending rearwardly from the lowermost end, a stationary inclined shelf or floor in said frame under each receptacle to form a temporary false bottom beneath said opening when said receptacle is in a normal position and means for locking said receptacles in normal positions.

7. A device of the class described, comprising an inclined slidable receptacle open at its upper end and having an opening in the bottom near its lower end, a stationary inclined shelf to form a temporary bottom beneath said opening when in a normal position, an extension casing forming a bag-holding chute into which said receptacle may be discharged when in an abnormal position, means for locking said receptacle in a normal position and means for releasing the same.

8. A device of the class described, comprising a plurality of inclined longitudinally movable receptacles each open at its upper end and having a discharge opening in the bottom, a common discharge chute arranged to receive said receptacles when moved into communication therewith for discharge, stationary inclined floors extending backwardly from the entrance of said chute beneath each of said receptacles to form false bottoms for normally closing the discharge openings therein and separately controlled means for holding each of said receptacles in a normal position.

9. A device of the class described in which is combined a plurality of adjacent tiers of movable receptacles, each receptacle having receiving and discharge openings, a discharge-chute common to the receptacles of each tier but normally out of communication therewith and means for independently moving any receptacle of any tier into discharging communication with the chute for that tier.

10. A device of the class described in which is combined a downwardly directed discharge chute, a plurality of downwardly inclined longitudinally movable receptacles common to said chute, each of said receptacles being open at its upper end and having a discharge opening adapted when said receptacle is in an abnormal position to communicate with said chute, said receptacles being supported in a common frame, a separate bail connected with each of said receptacles and extending to the rear of said chute for shifting said receptacle from a receiving to a discharging position and means for causing said bail to engage with a stationary stop for holding said receptacle in a normal position.

11. A device of the class described in which is combined a discharge chute, a plurality of downwardly inclined, longitudinally movable receptacles common to said chute but normally out of communication therewith, means for independently moving said receptacles into discharging positions, and means for cushioning the impact of said receptacles in their downwardly inclined movement.

12. The combination with a downward discharge chute, a plurality of downwardly inclined longitudinally movable receptacles common to said chute, each of said receptacles being open at its upper end and having a discharge opening adapted when said receptacle is in an abnormal position to communicate with said chute, a rearwardly extended bail connected with each of said receptacles for moving it back and forth, a stop adapted to be engaged by said bail for holding said receptacle in a normal position and a spring-buffer for arresting the downward movement of said receptacle.

13. A device of the class described in which is combined a discharge chute, a plurality of receptacles normally out of communication with said chute and means for bringing said chute and one of said receptacles into operative communication with each other to discharge the contents of the receptacle so brought into communication.

In testimony whereof, we have signed this specification in the presence of two subscribing witnesses, this first day of June 1912.

GEORGE A. GASMAN.
FRANK G. MURRAY.

Witnesses:
DAVID H. FLETCHER,
JENNIE L. FISKE.